Patented Aug. 23, 1932

1,873,945

UNITED STATES PATENT OFFICE

GEORG KRAENZLEIN, OF FRANKFORT-ON-THE-MAIN-HOCHST, AND RICHARD KARL MÜLLER, OF BAD SODEN-ON-THE-TAUNUS, GERMANY, ASSIGNORS TO I. G. FARBEN- INDUSTRIE AKTIENGESELLSCHAFT, OF FRANKFORT-ON-THE-MAIN, GERMANY

MATERIALS COATED WITH LACQUERS, LACQUERS, AND A PROCESS OF PRODUCING COATINGS

No Drawing. Application filed May 28, 1931, Serial No. 540,798, and in Germany March 29, 1930.

The present invention relates to materials coated with lacquers, to lacquers and to a process of producing coatings.

We have found that surfaces of materials of all kinds can be coated by applying on the surface lacquers containing an artificial resin capable of being hardened, an inorganic softening agent and a filling agent which has the property of rendering the coating resistant. Very valuable coatings are thus produced which are capable of being hardened and have advantageous properties in the hardened state.

The coatings may consist of one or more layers, and in the case of coatings comprising two or more layers, the inorganic softening agent and the filling agent imparting resistance may be constituents of different layers. Coatings may, for instance, be produced by applying to the surface two or more different layers of artificial resin capable of being hardened, the first layer containing an inorganic softening agent and the second or final, so-called protective, layer containing a filling agent capable of rendering the lacquer coating resistant. It is also possible to coat the surface with a lacquer which contains both an inorganic softening and a hardening filling agent. In this case a single coating may suffice as an anti-rust coating, but it may also be advisable to apply as a protective layer a second coating containing a hardening filling agent.

As artificial resins there may be used, for instance, phenol-aldehyde condensation products, phthalic acid-linoleic acid-glycerine-esters, urea-formaldehyde products or the like. Especially by means of the last-mentioned products lacquers which are soft and not brittle can be obtained.

As inorganic softening agents, that is to say as filling agents capable of rendering the lacquers soft and not brittle there may be used, for instance, graphite, pulverized asbestos, soot, talc, mica or the like, or mixtures of any of these agents with each other or with further additional substances.

As hardening filling agents, that is to say as agents possessing the property of rendering the lacquer coating resistant, there may be used, for instance, red lead, litharge, oxidized lead dust, pulverized quartz, silicon or the like. As filling agents for coatings, especially for the protective coatings as above referred to, which are not intended to be used as acid-proof coatings, but to serve only as a protective layer for the article in question, there may be used other metal oxides or finely subdivided metals, such as ferric oxide, titanium oxide, aluminium oxide, zinc oxide or the like or aluminium bronze, copper bronze or the like. Such coatings have the great advantage that besides their excellent protective properties against corrosion by weather, they are, on account of their hardness, very stable against mechanical strain without the drawbacks usually entailed by a hard coating, since these drawbacks are annulled by the underlying elastic layer.

Lacquers for producing the coatings may be made by incorporating in a suitable medium an artificial resin capable of being hardened, an inorganic softening agent and a filling agent capable of imparting resistance to the coating. When the coating is to comprise two or more layers, there may be prepared separately a lacquer containing resin and an inorganic softening agent and a lacquer containing resin and a filling agent of the kind referred to. The lacquers may, if desired, be made homogeneous, or may be finely subdivided in a celloid mill or in a simular apparatus. In order to improve the chemical and mechanical properties of the final layer, para formaldehyde in a quantity of $\frac{1}{2}$–2% may be added to the lacquers before applying them.

The lacquers may be applied by brushing, spraying, dipping or pouring. There are obtained easily adherent coatings of great hardness and thermal conductivity, and, at the same time, of very good elasticity.

The hardened lacquer coatings thus obtainable have an extremely stable and supple surface; they are very resistant to chemical or mechanical corrosion and are, nevertheless, soft and not brittle.

The following examples serve to illustrate the invention, but they are not intended to limit it thereto, the parts being by weight:—

(1) 240 parts of pulverized graphite (ground in a colloplex mill until the desired fineness is obtained), 240 parts of an aqueous suspension of 82 per cent. strength of a phenol-formaldehyde condensation product stirred together with 280 parts of alcohol and the mixture is made homogeneous, preferably in a colloid mill. A thinly liquid lacquer is obtained which can be used for making a thin first coating which can subsequently be smoothed for removing every unevenness.

(2) 80 parts of flake graphite, 80 parts of an aqueous suspension of 68 per cent. strength of a phenol-formaldehyde condensation product are ground together in a roller mill and the whole is diluted in the usual manner with 40 parts of alcohol. The lacquer obtained can chiefly be used for making thick first coatings and is particularly suitable for being subsequently hardened.

(3) 50 parts of American lamp black are mixed with 240 parts of alcohol and 50 parts of an aqueous suspension of 82 per cent. strength of a phenol-formaldehyde condensation product until the mixture is homogeneous.

(4) Instead of the phenol-formaldehyde condensation product in aqueous suspension used in Example 3, an anhydrous product is used and the process is otherwise carried out as described in Example 3.

(5) 50 parts of an aqueous suspension of 82 per cent. strength of a phenol-formaldehyde condensation product and 70 parts of talc are stirred with 40 parts of alcohol until the mixture is homogeneous. Instead of a phenol-formaldehyde condensation product, products resulting from the condensation of other phenols with aldehydes, for instance of cresol with formaldehyde may be used in Examples 1–5.

(6) 200 parts of the mixed glycerine ester of phthalic acid and linoleic acid are dissolved in 400 parts of acetone and the solution is ground with 100 parts of American lamp black so as to form a homogeneous lacquer.

The lacquers obtained according to Examples 3–6 are used for first coatings, on which a protective layer containing a hardening filling agent is applied.

(7) 40 parts of finely pulverized silicon (sieved through a sieve of 1400 meshes per sq. cm.), 40 parts of finely ground graphite and 60 parts of a phenol-formaldehyde condensation product are together kneaded with 90 parts of alcohol and the whole is stirred until homogeneous.

(8) 80 parts of flake graphite and 80 parts of red lead are mixed and the mixture is intimately ground with 160 parts of a phenol-formaldehyde condensation product and 130 parts of alcohol so as to form a homogeneous lacquer.

(9) 80 parts of pulverized silicon, 40 parts of pulverized asbestos and 120 parts of phenol-formaldehyde dissolved in 40 parts of alcohol are ground together and 70 parts of methyl cycylohexanon are added so as to obtain a lacquer.

(10) For coating pipes in order to protect them from becoming rusty, a lacquer as described in Example 8 or 9 may advantageously be used; it is also possible to coat the pipes with a lacquer made for instance as described in Example 6 and to cover the coating thus produced with a protective layer. In either case, the coating after having been dried in the air, is hardened by passing steam first at 100° C, and then at about 140–160° C. for several hours through the pipes.

(11) To a cast-iron vessel which has been freed from rust by means of a sand blast is applied a first coating of a lacquer made as described in Example 2, and then a second coating of a lacquer made as described in Example 8 and finally a coating of red lead lacquer made from 50 parts of red lead, 50 parts of a phenol-formaldehyde condensation product and 25 parts of alcohol. For the purpose of hardening each coating after it has been applied, the vessel is heated first for 5–7 hours at 100° C. and then for 1–2 hours at 160° C.–170° C. The vessel is finally absolutely acid-proof.

Other metals than iron may similarly be coated so as to become acid-proof, for instance copper, aluminium, magnesium, or the alloys thereof; the lacquers may also be used for protecting wood parts, for instance in filtering apparatus or the like.

(12) A cast-iron vessel is freed from rust by a sand blast apparatus and covered with a lacquer of the following composition:

(a) 50 parts of pulverized asbestos are stirred with 40 parts of an alcoholic solution of 85 per cent. strength of a phenol-formaldehyde condensation product and 25 parts of alcohol until a lacquer is obtained. The lacquer is preferably applied by spraying:

As a second layer there is used a lacquer of the following composition:

(b) 80 parts of pulverized asbestos, 80 parts of pulverized silicon, 100 parts of an alcoholic solution of 85 per cent. strength of a phenol-formaldehyde condensation product, and 100 parts of alcohol.

As a protective layer there is used a silicon-phenol-formaldehyde lacquer of the following composition:

(c) 135 parts of pulverized silicon, 165 parts of phenol-formaldehyde in alcoholic solution (75 per cent. strength) and 50 parts of alcohol are stirred until a homogeneous lacquer is obtained which may likewise be applied by spraying.

The pulverized silicon and asbestos have been sieved through a sieve of about 2600 meshes per sq. cm.

Each coating is hardenend for about 10 hours at 80–100° C. and the protective layer is furthermore hardened at a temperature between 160° C.–180° C. The vessel is absolutely acid-proof.

Instead of the first and second coating by means of the lacquer described in (a) and (b) there may be applied with great advantage three times a coating of a lacquer described in (b) or twice a coating with a lacquer described in (b) and twice a protective layer by means of the lacquer described in (c).

(13) A lacquer, containing a urea-formaldehyde condensation product and pulverized asbestos is applied on a surface so as to form a coating. The coating is hardened at a raised temperature and then a second layer containing a urea-formaldehyde condensation product and pulverized silicon is applied by spraying or brushing. After hardening an absolutely acid-proof coating is obtained.

We claim:

1. The process of producing coatings which comprises applying on a surface at least one layer containing a phenol-aldehyde resin capable of being hardened, pulverized asbestos and pulverized silicon.

2. The process of producing coatings which comprises applying on a surface at first at least one layer containing a phenol-aldehyde resin capable of being hardened, pulverized asbestos and then at least one layer containing a phenol-aldehyde resin capable of being hardened and pulverized silicon.

3. The process of producing coatings which comprises applying on a surface at first at least one layer containing a phenol-aldehyde resin capable of being hardened, pulverized asbestos and pulverized silicon and then at least one layer containing a phenol-aldehyde resin capable of being hardened and pulverized silicon.

4. As a new article of manufacture a material coated with at least one layer containing a phenol-aldehyde resin capable of being hardened, pulverized asbestos and pulverized silicon.

5. As a new article of manufacture a material coated with at least one layer containing a phenol-aldehyde resin capable of being hardened and pulverized asbestos and then with at least one layer containing a phenol-aldehyde resin capable of being hardened and pulverized silicon.

6. As a new article of manufacture a material coated with at least one layer containing a phenol-aldehyde resin capable of being hardened, pulverized asbestos and pulverized silicon and then with at least one layer containing a phenol-aldehyde resin capable of being hardened and pulverized silicon.

7. As a new article of manufacture a material coated at first with a layer containing a phenol-formaldehyde resin capable of being hardened and graphite and then with a layer containing a phenol-formaldehyde resin capable of being hardened and pulverized silicon.

8. As a new article of manufacture a cast-iron material coated at first with a layer containing a phenol-formaldehyde resin capable of being hardened and pulverized asbestos, then with a layer containing a phenol-formaldehyde resin capable of being hardened, pulverized asbestos and pulverized silicon and finally with a layer containing a phenol resin capable of being hardened and pulverized silicon.

9. As a new composition of matter, a lacquer containing a phenol-aldehyde resin capable of being hardened, pulverized asbestos and pulverized silicon.

In testimony whereof, we affix our signatures.

GEORG KRAENZLEIN.
RICHARD KARL MÜLLER.